(12) United States Patent
Scutchfield

(10) Patent No.: US 10,327,426 B2
(45) Date of Patent: Jun. 25, 2019

(54) SNAG FREE LURE ASSEMBLY

(71) Applicant: Robert Scutchfield, North Judson, IN (US)

(72) Inventor: Robert Scutchfield, North Judson, IN (US)

( * ) Notice: Subject to any disclaimer, the term of this patent is extended or adjusted under 35 U.S.C. 154(b) by 341 days.

(21) Appl. No.: 15/255,287

(22) Filed: Sep. 2, 2016

(65) Prior Publication Data

US 2018/0064082 A1 Mar. 8, 2018

(51) Int. Cl.
*A01K 85/02* (2006.01)
(52) U.S. Cl.
CPC .................................. *A01K 85/02* (2013.01)
(58) Field of Classification Search
CPC .............................. A01K 85/00; A01K 85/02
See application file for complete search history.

(56) References Cited

U.S. PATENT DOCUMENTS

| | | | | |
|---|---|---|---|---|
| 253,308 A | * | 2/1882 | Muller | A01K 85/02 43/35 |
| 395,480 A | * | 1/1889 | Brewster | A01K 85/02 43/35 |
| 1,172,780 A | * | 2/1916 | Ferree | A01K 83/02 43/35 |
| 1,318,073 A | * | 10/1919 | Gottschalk | A01K 85/02 43/35 |
| 1,362,562 A | * | 12/1920 | Doane | A01K 85/02 43/42.13 |
| 1,556,297 A | * | 10/1925 | Moore | A01K 85/02 43/35 |
| 2,041,634 A | * | 5/1936 | Boyko | A01K 85/02 43/35 |
| 2,456,665 A | * | 12/1948 | Adams | A01K 85/02 43/35 |
| 2,518,238 A | * | 8/1950 | Keeler | A01K 85/02 43/35 |
| 2,521,555 A | * | 9/1950 | Widmer | A01K 85/02 43/35 |
| 2,522,808 A | * | 9/1950 | Adams | A01K 85/02 43/35 |
| 2,544,782 A | * | 3/1951 | Fawcett | A01K 85/02 43/35 |
| 2,702,961 A | * | 3/1955 | Godbey | A01K 85/02 43/35 |
| 2,896,355 A | * | 7/1959 | Dean | A01K 85/02 43/35 |
| 3,411,233 A | | 11/1968 | Hopper | |

(Continued)

FOREIGN PATENT DOCUMENTS

| | | | | |
|---|---|---|---|---|
| CH | 169979 A | * | 6/1934 | ............. A01K 85/02 |
| CH | 219359 A | * | 2/1942 | ............. A01K 85/02 |

(Continued)

*Primary Examiner* — Kathleen I Alker

(57) ABSTRACT

A snag free lure assembly includes a lure that may be cast into a body of water. Thus, the lure may lure a fish. A retracting unit is positioned within the lure. The retraction unit includes a plurality of hooks. The retracting unit retracts each of the hooks into the lure to inhibit the lure from being snagged when the lure is cast. The retracting unit selectively deploys each of the hooks outwardly from the lure when a fish bites the lure. Thus, the lure hooks the fish.

9 Claims, 4 Drawing Sheets

(56) References Cited

U.S. PATENT DOCUMENTS

| | | | | |
|---|---|---|---|---|
| 3,492,753 A | * | 2/1970 | Richard | A01K 85/02 43/35 |
| 3,574,265 A | * | 4/1971 | Gibbons | A01K 85/02 43/35 |
| 3,739,517 A | | 6/1973 | Schleif | |
| 3,786,587 A | * | 1/1974 | Niileksela | A01K 85/02 43/35 |
| 3,802,114 A | * | 4/1974 | Diebold | A01K 85/02 43/37 |
| 3,816,953 A | * | 6/1974 | Hameen-Anttila | A01K 83/02 43/35 |
| 4,274,220 A | * | 6/1981 | Rogers, Jr. | A01K 85/16 43/35 |
| 4,656,775 A | * | 4/1987 | Annett, II | A01K 85/16 43/35 |
| 4,760,665 A | * | 8/1988 | Stueber | A01K 83/02 43/36 |
| 4,765,084 A | | 8/1988 | Braden | |
| 6,574,907 B1 | | 6/2003 | Mitton | |
| 6,574,908 B1 | * | 6/2003 | Sanner | A01K 83/02 43/36 |
| 6,711,848 B1 | | 3/2004 | Gammieri | |
| 6,868,632 B1 | * | 3/2005 | Heck | A01K 85/02 43/37 |
| 7,322,147 B1 | * | 1/2008 | Queen, Jr. | A01K 91/10 43/15 |
| D588,673 S | | 3/2009 | Leppala | |
| 2006/0090389 A1 | | 5/2006 | An | |
| 2007/0180756 A1 | * | 8/2007 | McHone | A01K 83/02 43/26.2 |
| 2014/0013468 A1 | | 1/2014 | Kaeppler et al. | |

FOREIGN PATENT DOCUMENTS

| | | | | |
|---|---|---|---|---|
| FR | 731625 A | * | 9/1932 | A01K 85/02 |
| FR | 1028441 A | * | 5/1953 | A01K 85/02 |
| FR | 2814336 A1 | * | 3/2002 | A01K 85/02 |
| GB | 781779 A | * | 8/1957 | A01K 85/02 |
| WO | WO2009142694 | | 11/2009 | |
| WO | WO 2015177403 | * | 11/2015 | A01K 85/02 |

* cited by examiner

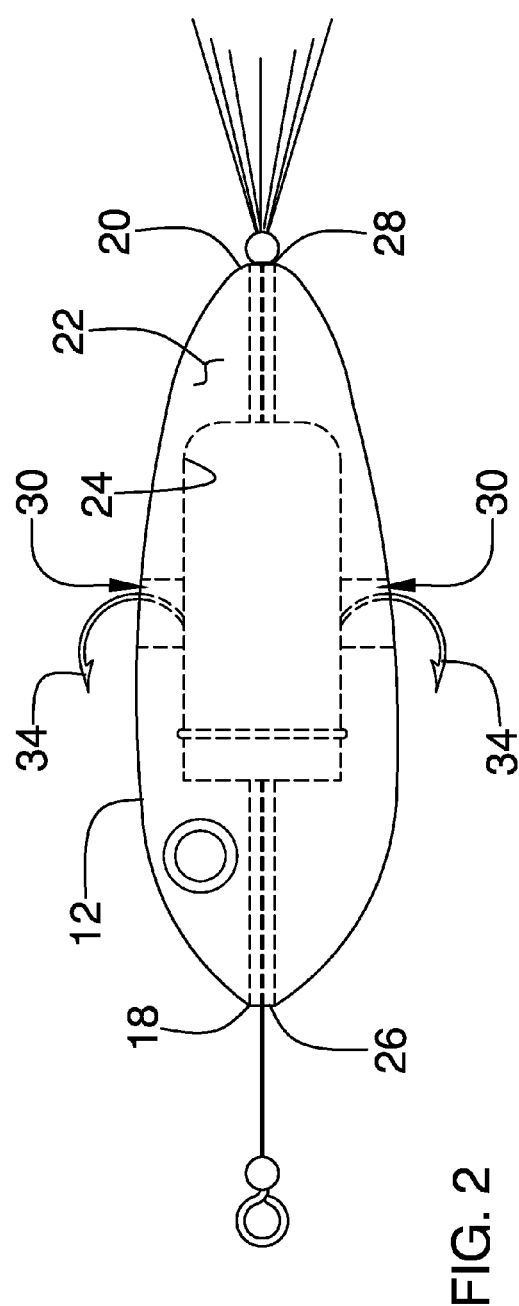
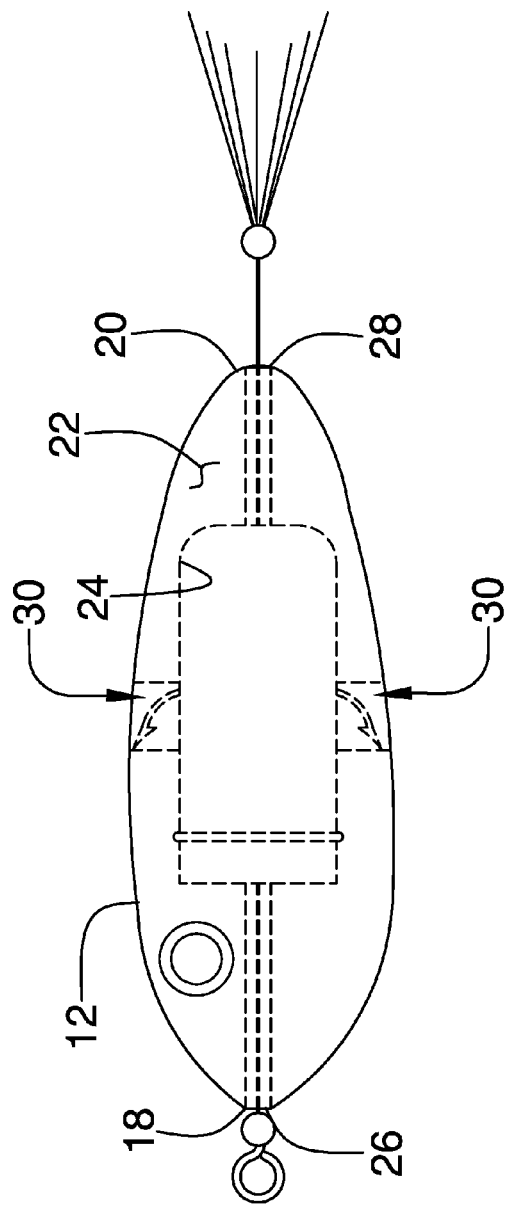

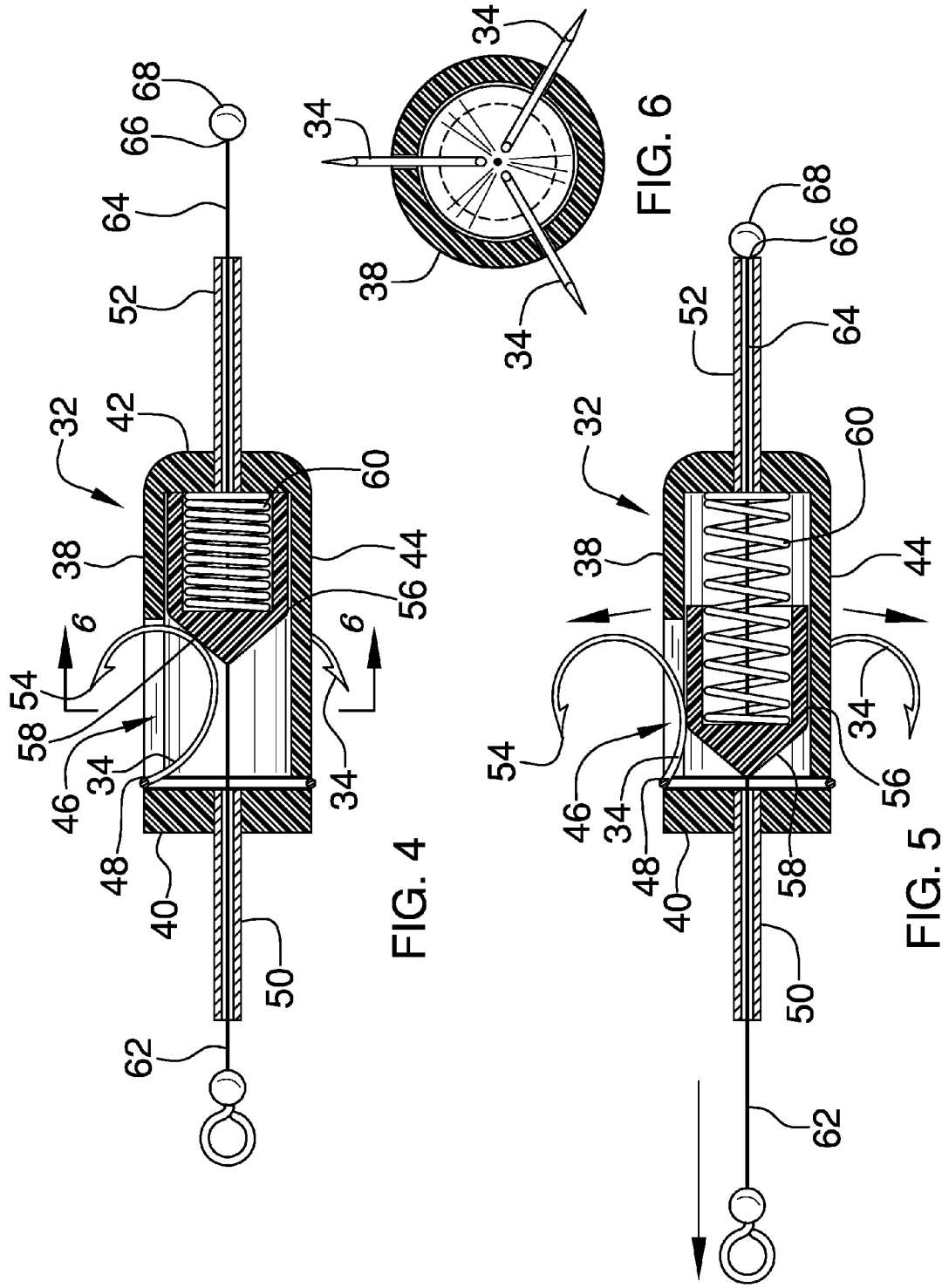

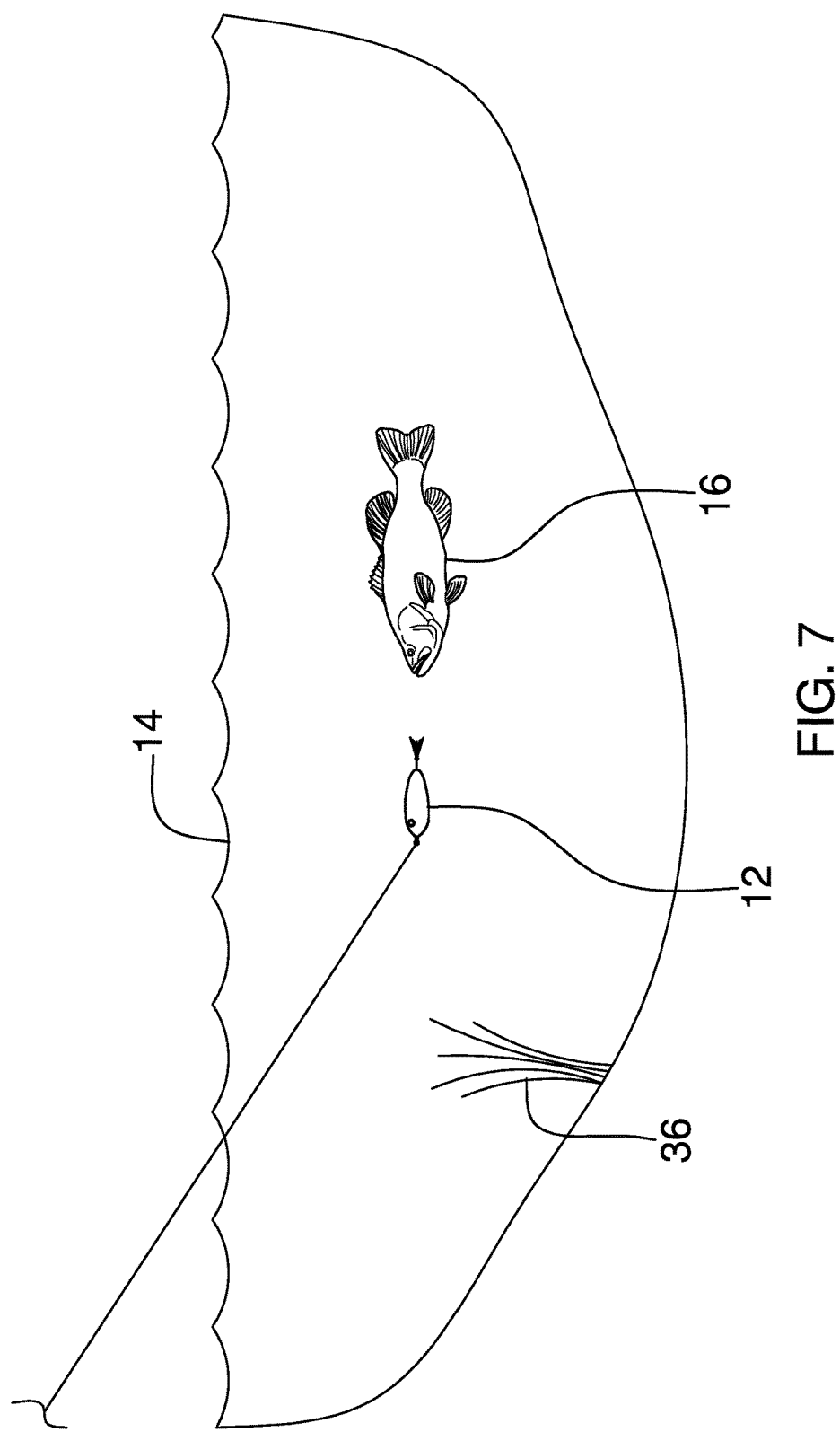

US 10,327,426 B2

SNAG FREE LURE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to lure devices and more particularly pertains to a new lure device for casting without snagging.

BRIEF SUMMARY OF THE INVENTION

An embodiment of the disclosure meets the needs presented above by generally comprising a lure that may be cast into a body of water. Thus, the lure may lure a fish. A retracting unit is positioned within the lure. The retraction unit includes a plurality of hooks. The retracting unit retracts each of the hooks into the lure to inhibit the lure from being snagged when the lure is cast. The retracting unit selectively deploys each of the hooks outwardly from the lure when a fish bites the lure. Thus, the lure hooks the fish.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a left side phantom view of an embodiment of the disclosure in a deployed position.

FIG. 3 is a left side phantom view of an embodiment of the disclosure in a retracted position.

FIG. 4 is a cross sectional view of a retraction unit in a retracted position taken along line 4-4 of FIG. 1 of an embodiment of the disclosure.

FIG. 5 is a cross sectional view of a retraction unit in a deployed position taken along line 4-4 of FIG. 1 an embodiment of the disclosure.

FIG. 6 is a cross sectional view of retraction unit taken along line 6-6 of FIG. 4 an embodiment of the disclosure.

FIG. 7 is a perspective in-use view of an embodiment of the disclosure.

DETAILED DESCRIPTION OF THE INVENTION

Figure 1:
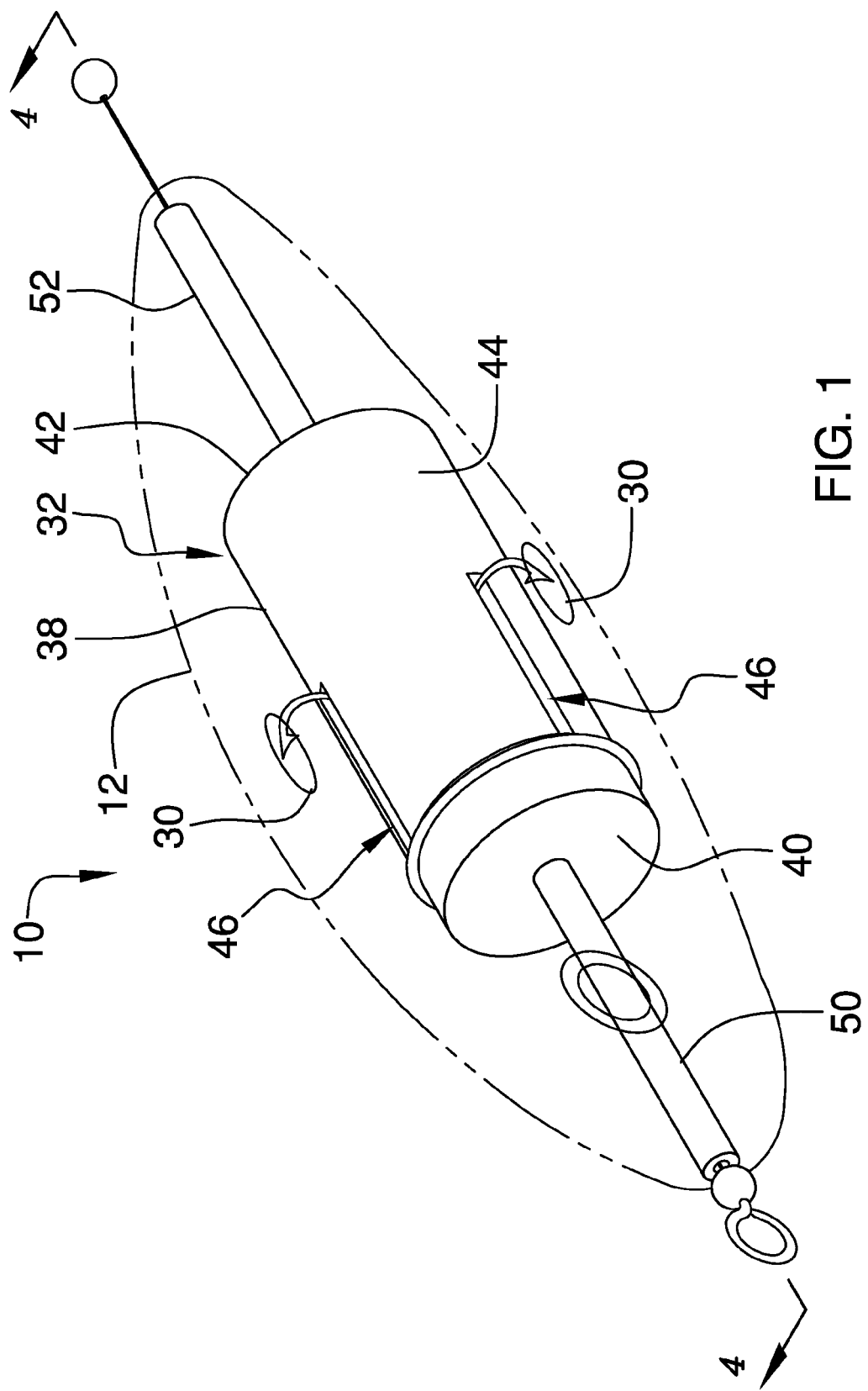
FIG. 1 is a phantom perspective view of a snag free lure assembly according to an embodiment of the disclosure.

With reference now to the drawings, and in particular to FIGS. 1 through 7 thereof, a new lure device embodying the principles and concepts of an embodiment of the disclosure and generally designated by the reference numeral 10 will be described.

As best illustrated in FIGS. 1 through 7, the snag free lure assembly 10 generally comprises a lure 12 that may be cast into a body of water 14 thereby facilitating the lure 12 to lure a fish 16. The body of water 14 may be a lake or the like. The lure 12 has a first end 18, a second end 20 and an outer surface 22 extending therebetween. The outer surface 22 is continuous such that the lure 12 is substantially ovoid shaped.

A chamber 24 is centrally positioned within the lure 12. The first end 18 has a first opening 26 extending into the chamber 24. The second end 20 has a second opening 28 extending into the chamber 24. The outer surface 22 has a plurality of third openings 30 and each of the third openings 30 extends into the chamber 24. The third openings 30 are spaced apart from each other and are distributed around the lure 12.

A retracting unit 32 is provided and the retracting unit 32 is positioned within the lure 12. The retraction unit includes a plurality of hooks 34. The retracting unit 32 retracts each of the hooks 34 into the lure 12. Thus, the lure 12 is inhibited from being snagged on an object 36 in the body of water 14 when the lure 12 is cast. The object 36 may be vegetation or the like. The retracting unit 32 selectively deploys each of the hooks 34 outwardly from the lure 12 when a fish 16 bites. Thus, the lure 12 may hook the fish 16.

The retracting unit 32 comprises a cylinder 38. The cylinder 38 has a primary end 40, a secondary end 42 and an outer wall 44 extending therebetween. The cylinder 38 is substantially hollow and the cylinder 38 is positioned within the chamber 24. The outer wall 44 has a plurality of hook openings 46 extending into an interior of the cylinder 38. Each of the hook openings 46 has a bounding edge 48. The hook openings 46 are spaced apart from each other and are distributed around the cylinder 38. Each of the hook openings 46 is aligned with an associated one of the third openings 30 in the lure 12.

A first tube 50 is coupled to and extends away from the primary end 40 of the cylinder 38. The first tube 50 is positioned within the first opening 26 in the lure 12. A second tube 52 is coupled to and extends away from the secondary end 42 of the cylinder 38. The second tube 52 is positioned within the second opening 28 in the lure 12.

Each of the hooks 34 is hingedly coupled to the bounding edge 48 of an associated one of the hook openings 46. Each of the hooks 34 has a distal end 54 with respect to the bounding edge 48. Each of the hooks 34 is curved between the bounding edge 48 and the distal end 54.

Each of the hooks 34 is biased to be substantially positioned within the cylinder 38. Moreover, each of the hooks 34 may be biased via a spring loaded hinge or the like. The spring loaded hinge may have an engaging force ranging between approximately two hundred fifty grams and five hundred grams.

A piston 56 is slidably positioned within the cylinder 38. The piston 56 has an engaging surface 58 and the engaging surface 58 tapers to a point. The piston 56 is positioned in a retracted position in FIG. 4. The engaging surface 58 is spaced from primary end 40 of the cylinder 38 when the piston 56 is in the retracted position.

The piston 56 is positioned in a deployed position in FIG. 5. The engaging surface 58 frictionally engages each of the hooks 34 when the piston 56 is in the deployed position. Thus, each of the hooks 34 is urged to extend outwardly from the associated hook opening and the associated third openings 30 in the lure 12. Each of the hooks 34 may hook the fish 16 when the piston 56 is positioned in the deployed position.

A biasing member 60 is positioned between the piston 56 and the secondary end 42 of the cylinder 38. The biasing member 60 biases the piston 56 towards the deployed position. The biasing member 60 may be a spring or the like. The biasing member 60 may have a compressive force ranging between one hundred grams and two hundred grams. Thus, the biasing member 60 does not have enough force to urge the piston 56 into the deployed position.

A first leader 62 is coupled to the engaging surface 58 of the piston 56 and the first leader 62 extends through the first tube 50. The first leader 62 extends outwardly from the first opening 26 in the lure 12. The first leader 62 may be coupled to a fishing line or the like.

A second leader 64 is coupled to the piston 56 and extends through the second tube 52. The second leader 64 extends outwardly from the second opening 28 in the lure 12. The second leader 64 has a distal end 66 with respect to the lure 12. Each of the first leader 62 and the second leader 64 may be fishing leaders or the like.

A ball 68 is coupled to the distal end 66 of the second leader 64 and the ball 68 may be manipulated. The ball 68 is urged away from the second end 20 of the lure 12 such that the piston 56 is positioned in the retracted position. The ball 68 engages the second end 20 of the lure 12 when the piston 56 is urged into the deployed position. A feather may be coupled to the ball 68 thereby enhancing an ornamental appearance of the ball 68.

In use, the first leader 62 is coupled to the fishing line and the lure 12 is cast into the body of water 14. The lure 12 is retrieved with the fishing line. The hooks 34 are positioned within the lure 12 when the lure 12 is retrieved. Thus, the lure 12 is inhibited from snagging the object 36 in the body of water 14.

The lure 12 is pulled against the fishing line when the fish 16 bites the lure 12. The piston 56 is urged into the deployed position and the piston 56 urges each of the hooks 34 to extend outwardly from the lure 12. Thus, the hooks 34 hook the fish 16 thereby facilitating the fish 16 to be landed. The ball 68 is gripped and the ball 68 is urged away from the lure 12 when the hooks 34 are removed from the fish 16. Thus, the piston 56 is urged into the retracted position and the hooks 34 are contained within the lure 12. The lure 12 is repeatedly cast into the body of water 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A snag free lure assembly being configured to inhibit becoming snagged, said assembly comprising:

a lure being configured to be cast into a body of water thereby facilitating said lure to lure a fish, said lure having a chamber, said lure having a first end, a second end and an outer surface extending therebetween, said first end having a first opening extending into said chamber, said second end having a second opening extending into said chamber, said lure having a plurality of third openings; and a retracting unit being positioned within said lure, said retracting unit including a plurality of hooks, each of said hooks being retractable into said lure wherein said lure is configured to be inhibited from being snagged on an object by said hooks when said lure is cast, each of said hooks being outwardly deployed from said lure when a fish bites said lure wherein said lure is configured to hook the fish, said retracting unit comprising a cylinder having a primary end, a secondary end and an outer wall extending therebetween, said cylinder being substantially hollow, said cylinder being positioned within said chamber, said outer wall having a plurality of hook openings extending into an interior of said cylinder, each of said hook openings having a bounding edge, said hook openings being spaced apart from each other and being distributed around said cylinder, each of said hook openings being aligned with an associated one of said third openings in said lure, a first tube, a first leader extending through said first tube, a second tube, a second leader being coupled to said piston and extending through said second tube, said second leader extending outwardly from said second opening in said lure, said second leader having a distal end with respect to said lure;

each of said hooks being hingedly coupled to said bounding edge of an associated one of said hook openings, each of said hooks having a distal end with respect to said bounding edge, each of said hooks being curved between said bounding edge and said distal end, each of said hooks being biased to be positioned within said cylinder, a piston being slidably positioned within said cylinder, said piston having an engaging surface, said engaging surface tapering to a point, said piston being positionable in a retracted position having said engaging surface being spaced from said primary end of said cylinder, said piston being positionable in a deployed position having said engaging surface frictionally engaging each of said hooks such that each of said hooks is urged to extend outwardly from said associated hook opening and said associated third openings in said lure wherein each of said hooks is configured to hook the fish.

2. The assembly according to claim 1, wherein said outer surface being continuous such that said lure is substantially ovoid shaped, said chamber being centrally positioned within said lure.

3. The assembly according to claim 2, wherein said outer surface having a plurality of third openings, each of said third openings extending into said chamber, said third openings being spaced apart from each other and being distributed around said lure.

4. The assembly according to claim 1, further comprising said first tube being coupled to and extending away from said primary end of said cylinder, said first tube being positioned within said first opening in said lure.

5. The assembly according to claim 1, further comprising said second tube being coupled to and extending away from said secondary end of said cylinder, said second tube being positioned within said second opening in said lure.

6. The assembly according to claim 1, further comprising a biasing member being positioned between said piston and said secondary end of said cylinder, said biasing member biasing said piston towards said deployed position.

7. The assembly according to claim 1, further comprising: said first leader being coupled to said engaging surface of said piston, said first leader extending outwardly from said first opening in said lure, said first leader being configured to be coupled to a fishing line.

8. The assembly according to claim 1, further comprising: said lure having a second end; and
a ball being coupled to said distal end of said second leader wherein said ball is configured to be manipulated, said ball being urged away from said second end of said lure when said piston is positioned in said retracted position, said ball engaging said second end of said lure when said piston is urged into said deployed position.

9. A snag free lure assembly being configured to inhibit becoming snagged, said assembly comprising:
a lure being configured to be cast into a body of water thereby facilitating said lure to lure a fish, said lure having a first end, a second end and an outer surface extending therebetween, said outer surface being continuous such that third said lure is substantially ovoid shaped, said lure having a chamber being centrally positioned within said lure, said first end having a first opening extending into said chamber, said second end having a second opening extending into said chamber, said outer surface having a plurality of third openings, each of said third openings extending into said chamber, said third openings being spaced apart from each other and being distributed around said lure; and a retracting unit being positioned within said lure, said retraction unit including a plurality of hooks, each of said hooks being retractable into said lure wherein said lure is configured to be inhibited from being snagged on an object by said hooks when said lure is cast, each of said hooks being outwardly deployed from said lure when a fish bites said lure wherein said lure is configured to hook the fish, said retracting unit comprising:
a cylinder having a primary end, a secondary end and an outer wall extending therebetween, said cylinder being substantially hollow, said cylinder being positioned within said chamber, said outer wall having a plurality of hook openings extending into an interior of said cylinder, each of said hook openings having a bounding edge, said hook openings being spaced apart from each other and being distributed around said cylinder, each of said hook openings being aligned with an associated one of said third openings in said lure, a first tube being coupled to and extending away from said primary end of said cylinder, said first tube being positioned within said first opening in said lure, a second tube being coupled to and extending away from said secondary end of said cylinder, said second tube being positioned within said second opening in said lure, each of said hooks being hingedly coupled to said bounding edge of said of an associated one of said hook openings, each of said hooks having a distal end with respect to said bounding edge, each of said hooks being curved between said bounding edge and said distal end, each of said hooks being biased to be positioned within said cylinder, a piston being slidably positioned within said cylinder, said piston having an engaging surface, said engaging surface tapering to a point, said piston being positionable in a retracted position having said engaging surface being spaced from said primary end of said cylinder, said piston being positionable in a deployed position having said engaging surface frictionally engaging each of said hooks such that each of said hooks is urged to extend outwardly from said associated hook opening and said associated third opening in said lure wherein each of said hooks is configured to hook the fish, a biasing member being positioned between said piston and said secondary end of said cylinder, said biasing member biasing said piston towards said deployed position, a first leader being coupled to said engaging surface of said piston and extending through said first tube, said first leader extending outwardly from said first opening in said lure, said first leader being configured to be coupled to a fishing line, a second leader being coupled to said piston and extending through said second tube, said second leader extending outwardly from said second opening in said lure, said second leader having a distal end with respect to said lure, and a ball being coupled to said distal end of said second leader wherein said ball is configured to be manipulated, said ball being urged away from said second end of said lure when said piston is positioned in said retracted position, said ball engaging said second end of said lure when said piston is urged into said deployed position.

\* \* \* \* \*